United States Patent [19]
Wu et al.

[11] Patent Number: 5,905,887
[45] Date of Patent: May 18, 1999

[54] CLOCK FREQUENCY DETECTION FOR COMPUTER SYSTEM

[75] Inventors: Shyh-Jia Wu, San Ramon; Ho-Wen Chen, San Jose, both of Calif.

[73] Assignee: OPTi Inc., Milpitas, Calif.

[21] Appl. No.: 08/888,436

[22] Filed: Jul. 7, 1997

Related U.S. Application Data

[63] Continuation of application No. 08/396,735, Mar. 1, 1995, abandoned.

[51] Int. Cl.$^6$ .................................................. G06F 1/04
[52] U.S. Cl. ............................................. 395/555
[58] Field of Search .................................. 395/551, 555, 395/556, 557, 558, 559, 560, 309

[56] References Cited

U.S. PATENT DOCUMENTS

| | | | |
|---|---|---|---|
| 4,257,003 | 3/1981 | Yool ....................................... | 324/78 D |
| 4,456,876 | 6/1984 | Haymaker ............................... | 324/77 R |
| 4,616,173 | 10/1986 | Cook et al. ............................. | 324/78 D |
| 4,945,303 | 7/1990 | Hwang et al. .......................... | 324/78 D |
| 5,235,699 | 8/1993 | Shaffer et al. .......................... | 395/550 |
| 5,371,880 | 12/1994 | Bhattacharya ........................... | 395/550 |
| 5,459,855 | 10/1995 | Lelm ....................................... | 395/550 |
| 5,506,875 | 4/1996 | Nuckolls et al. ....................... | 375/375 |
| 5,511,100 | 4/1996 | Lundberg et al. ...................... | 375/376 |

OTHER PUBLICATIONS

Liu et al., Microcomputer Systems: The 8086/8088 Family, Prentice–Hall, 1986, pp. 308–319, 346–349 and 378–384.
Joseph D. Greenfield, "Practical Digital Design Using Ics", John Wiley & Sons, 1983, pp. 139–143.

OPTi, Inc., "OPTi–386WB PC/AT Chipset (82C391/82C392/82C206)", Preliminary 82C391/82C392 Data Book, Ver. 1.2, Mar. 28, 1991.

Intel Corporation, "i486™ Microprocessor", Data Book, Nov. 1989.

*Primary Examiner*—Dennis M. Butler
*Attorney, Agent, or Firm*—Fliesler, Dubb, Meyer & Lovejoy LLP

[57] ABSTRACT

In an IBM PC/AT-compatible computer system, the frequency of the CPU bus clock signal is detected via a hardware apparatus in the I/O interface chipset. The CPU reads the hardware-detected clock frequency from an I/O register. In one embodiment, one bit of the data returned from the register indicates whether the clock frequency indicated by the remainder of the bits is valid. The CPU can trigger the hardware to autodetect the clock frequency by writing arbitrary data to the same address. The hardware clock frequency detection circuitry operates by, in response to a start signal, counting the number of cycles of the CPU clock signal which occur within a predefined number of cycles of the ISA-bus OSC signal. The start signal can be asserted in response negation of the system reset signal, or in response to a write access on the ISA bus to a predefined I/O register, or both. The clock frequency detection apparatus can include validation circuitry which asserts the validity signal only after the count is complete, and only if the count value has not exceeded a predetermined maximum count.

24 Claims, 6 Drawing Sheets

CLOCK FREQUENCY DETECTION FOR COMPUTER SYSTEM

This application is a continuation of Ser. No. 08/396,735, filed Mar. 1, 1995, now abandoned.

BACKGROUND

1. Field of the Invention

The invention relates to computer systems having a clock signal which can operate at different speeds in different systems, and more particularly to a mechanism for detecting such clock frequency.

2. Description of Related Art

A typical personal computer systems includes a microprocessor, such as an Intel i386, i486 or Pentium® microprocessor, which is coupled to a CPU bus having data, address and control signal lines. The typical IBM PC AT-compatible platform also includes DRAM main memory, and in many cases a timer, a real-time clock, and a cache memory. The typical IBM PC AT-compatible computer also includes an I/O bus, also known as an AT-bus, which is separate and distinct from the CPU bus. The I/O bus usually conforms to one of two industry-established standards known as ISA (Industry Standard Architecture) and EISA (Extended ISA). The I/O bus is coupled to the CPU bus via an I/O interface chipset, and includes address, data and control lines. The I/O address space is logically distinct from the memory address space and if the CPU desires to access an I/O address, it does so by executing a special I/O instruction. Such an I/O instruction generates memory access signals on the CPU bus, but also activates an M/IO# signal on the CPU bus to indicate that this is an access to the I/O address space. The I/O interface chipset recognizes the I/O signals thereby generated by the CPU, performs the desired operation over the I/O bus, and if appropriate, returns results to the CPU over the CPU bus.

In practice, some I/O addresses may reside physically on the CPU bus and some memory addresses may reside physically on the I/O bus. More specifically, the devices which respond to accesses to certain I/O space addresses may be connected to the control lines (and usually the address and data lines as well) of the CPU bus, while the devices which respond to accesses to certain memory space addresses may be connected to the control lines (and usually the address and data lines as well) of the I/O bus. The I/O interface circuitry is responsible for recognizing that a memory or I/O address access must be emulated by an access to the other bus, and is responsible for doing such emulation.

General information on the various forms of IBM PC AT-compatible computers can be found in IBM, "Technical Reference, Personal Computer AT" (1985), in Sanchez, "IBM Microcomputers: A Programmer's Handbook" (McGraw-Hill: 1990), in MicroDesign Resources, "PC Chip Sets" (1992), and in Solari, "AT Bus Design" (San Diego: Annabooks, 1990). See also the various data books and data sheets published by Intel Corporation concerning the structure and use of the iAPX-86 family of microprocessors, including Intel Corp., "Pentium™ Processor", Preliminary Data Sheet (1993); Intel Corp., "Pentium™ Processor User's Manual" (1994); "i486 Microprocessor Hardware Reference Manual", published by Intel Corporation, copyright date 1990, "386 SX Microprocessor", data sheet, published by Intel Corporation (1990), and "386 DX Microprocessor", data sheet, published by Intel Corporation (1990). All the above references are incorporated herein by reference.

The various signals on the CPU bus include the input/output signals of whichever microprocessor the system is built around. Such signals are therefore well known in the industry and can be determined by reference to the above-incorporated publications. The various signals on the I/O bus also are well known in the industry. The Solari book incorporated above describes the lines in detail.

In an effort to minimize the number of integrated circuit chips required to build a PC AT-compatible computers, several manufacturers have developed "PC AT chipsets" (also known as "core logic chipsets" or "I/O bus interface chipsets"), which integrate a large amount of the I/O bus interface circuitry and other circuitry onto only a few chips. An example of such a chipset is the 386WB PC/AT chipset manufactured by OPTi Inc., Santa Clara, Calif. These chipsets implement the I/O bus interface circuitry, the timer, real-time clock (RTC), DMA controller, as well as some additional functionality.

For many purposes, the I/O interface chipset needs to know what the CPU clock frequency is. The CPU clock frequency is the frequency of a clock signal upon which all synchronous operations on the CPU bus are timed. The CPU clock speed can vary widely for different microprocessors. Presently, CPU clock speeds can vary from about 25 MHz to about 66 MHz. Note that as used herein, the CPU clock frequency is the frequency of the clock signal on the CPU bus. This clock signal is applied to the CPU itself, and it may be doubled, tripled or quadrupled internally to the CPU.

One reason that the CPU clock frequency needs to be known is that in typical systems, the I/O interface chipset generates the I/O bus BCLK signal by dividing down the CPU bus clock signal. The ISA specification requires that BCLK be between 6 MHz and 8.33 MHz, and marketing considerations mandate that it be as close to 8.33 MHz as possible. The chipset therefore needs to know the CPU clock frequency in order to know what divisor to use to generate BCLK.

As another example, for certain lengthy combinational signal paths in the system, if the I/O interface chipset needs to sample the output of the signal path synchronously with the CPU clock, then the chipset needs to know how many CPU clock signals to wait before sampling the result. For optimum performance, this number of clock cycles will depend on the frequency of the CPU clock signal.

In the past, the CPU clock frequency was determined through a software technique at system boot time. Specifically, the ROM firmware contained code which performed 1000 loops in RAM. Each iteration of the loop took a known number of CPU cycles, for example 100 CPU cycles, because the number of CPU cycles required for each instruction in the loop was known. Before starting the loop, an internal counter/timer was initialized. When the 1000 loops completed, the counter/timer was read. Since the input clock to the counter/timer was known to be approximately 1.19 MHz, the autodetect software was able to calculate the internal CPU speed by dividing the total number of CPU cycles executed in the loop (e.g. 100,000), by the time in seconds read from the counter/timer. This division was performed by a software table look-up.

Once the internal CPU clock speed was known, the software routine would read the CPU revision ID. This ID was used, together with a knowledge of the particular platform hardware, to calculate the CPU clock frequency external to the chip. For example, if the microprocessor was a DX2 chip and the iterative procedure calculated an internal clock frequency of 66.67 MHz, then the software determined that the external CPU clock frequency was half of 66.67 MHz, or 33.33 MHz. The software would then program I/O registers in the I/O interface chipset according to the detected clock speed.

The use of the software routine for detecting the CPU clock speed causes a number of problems. First, it takes a certain amount of time to complete, time which it would be preferable to avoid. Second, while the timing loop itself may be small, a certain amount of code was required to place the system in a known state to ensure that each iteration of the loop did in fact take the number of internal CPU clock cycles expected. For example, caching must be enabled to ensure that all instructions in the loop were fetched with the timing of a cache read hit.

Most significantly, however, the software detection mechanism must be tuned differently for different platforms. For example, different systems have different caching configurations and may require adjustments for that reason. As another example, different ones of the Intel microprocessors, and especially different Intel-compatible microprocessors which are not manufactured by Intel, may take a different number of internal CPU clock cycles to perform the different instructions in the loop. As yet another example, personal computers which are built around RISC-based microprocessors are becoming increasingly popular. These microprocessors do not necessarily support even the same instructions as those used in the auto-clock detect loop for an Intel microprocessor. Such systems also may not even include a counter/timer, and if they do, they may not be clocked at the 1.19 MHz frequency at which the Intel counter/timers are clocked. It has been suggested that clock frequency detection apparatus be included in hardware circuitry in the I/O interface chipset, but no mechanism for performing such detection or for communicating the detected frequency to the CPU, has been proposed.

Accordingly, there is a need for a mechanism for automatically detecting the frequency of a clock signal in a computer system without relying on a software timing loop.

SUMMARY OF THE INVENTION

According to the invention, roughly described, the frequency of the CPU bus clock signal is detected via a hardware apparatus in the I/O interface chipset. In one aspect of the invention, the CPU, under the control of programmed instructions, reads the hardware-detected clock frequency from an I/O register. In one embodiment, one bit of the data returned from the register indicates whether the clock frequency indicated by the remainder of the bits is valid. The CPU can trigger the hardware to autodetect the clock frequency by writing arbitrary data to the same address.

In another aspect of the invention, hardware clock frequency detection circuitry operates by, in response to a start signal, counting the number of cycles of the CPU clock signal which occur within a predefined number of cycles of the ISA-bus OSC signal. The start signal can be asserted in response to negation of the system reset signal, or in response to a write access on the ISA bus to a predefined I/O register, or both. In one embodiment, the apparatus converts the resulting count via a combinational decoder to a code which indicates the frequency of the CPU clock signal. This code can be made available to a CPU by reading an I/O register address. In one embodiment, the clock frequency detection apparatus can include validation circuitry which asserts a validity signal only after the count is complete, and only if the count value has not exceeded a predetermined maximum count.

BRIEF DESCRIPTION OF THE DRAWINGS

The invention will be described with respect to particular embodiments thereof, and reference will be made to the drawings, in which.

DETAILED DESCRIPTION

Figure 1:
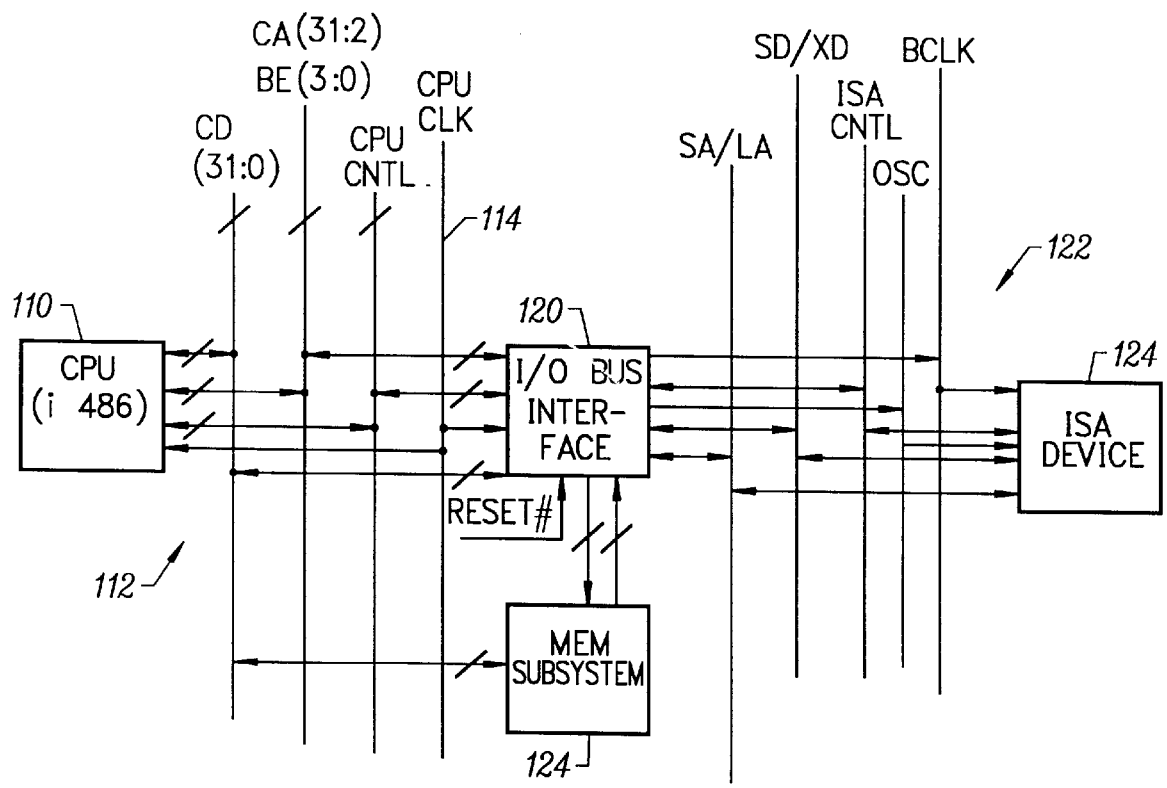
FIG. 1 is a block diagram of functional units in a computer system incorporating the invention.

FIG. 1 is a block diagram of various functional units in one type of an IBM PC AT-compatible computer system which incorporates the invention. It comprises a central processing unit (CPU) 110, which may be, for example, an Intel i486 microprocessor. Alternatively, the CPU 110 may include on-chip and/or off-chip cache memory, a coprocessor, a plurality of microprocessors, and/or another type of microprocessor such as a RISC microprocessor. The Intel i486 microprocessor is described in Intel Corporation, "i486 Microprocessor" (1989) and in Intel Corporation, "i486 Microprocessor Hardware Reference Manual" (1990).

The CPU 110 is coupled to a CPU bus 112, which includes 32 data lines CD(31:0), address lines CA(31:2) and BE(3:0), various control lines labeled CPU bus CNTL, and a CPU clock line 114.

The system of FIG. 1 also includes I/O interface circuitry 120 (also referred to herein as "core logic chipset"), coupled between the CPU bus 112 and an I/O bus 122. The I/O bus interface circuitry 120 may actually be divided up into two or more chips of a chipset, but the division of functions between various chips in such a chipset is not important to an understanding of the invention. In addition to circuitry for interfacing between the CPU bus 112 and the I/O bus 122, the interface circuitry 120 also includes an oscillator (not shown separately) which produces an oscillator output signal having a frequency of approximately 14.31818 MHz. The I/O bus interface circuitry 120 also includes an interface to a memory subsystem 124, which is also coupled to the CPU bus 112 data lines CD(31:0). The memory subsystem 124 may include its own cache memory.

The I/O bus interface circuitry 120 also includes a number of other components controlling various aspects of the computer system. In one embodiment, the I/O bus interface circuitry 120 includes a part No. 82C802GP System/Power Management Controller, manufactured by OPTi Inc., Santa Clara, Calif. The chipset is described in OPTi Inc., "82C802GP System/Power Management Controller, Preliminary Data Book", rev. 1.0 (Nov. 1994), incorporated by reference herein.

The ISA bus 122 includes the standard signal lines as described in the Solari book incorporated above. These signal lines include a plurality of address lines SA/LA, a 16-bit wide data bus SD, the low order 8 bits of which are buffered on a data bus XD, a plurality of control lines indicated as ISA CNTL, and a bus clock BCLK line. One of the ISA bus control lines driven by I/O bus interface 120 is shown separately in FIG. 1 as OSC. This line carries the 14.31818 MHz oscillator clock signal mentioned above. As described in Solari, in a conventional system, the OSC signal is divided by 12 and provided to a timer which generates a refresh pulse every 15.6 microseconds to the refresh circuitry.

Also shown in FIG. 1 is an ISA bus device 124 coupled to the ISA bus 122.

As is well known, the CPU 110, if it is an Intel x86-compatible processor, performs data accesses (reads and/or writes) in two distinct address spaces, known as the memory address space and the I/O address space. One of the CPU CNTL lines is M/IO# which indicates whether an address currently on the CPU bus address lines is to be interpreted as a memory address or an I/O address. Accesses to the I/O address space are usually translated by the I/O bus interface circuitry onto the I/O bus 122 for response by an I/O bus device. The assignment of many of the addresses in the I/O address space, also known as I/O port addresses, is generally standard throughout the personal computer industry. For example, certain port addresses are always responded to by a disk drive controller, while others are always responded to by a serial port card. Two of the port addresses, specifically ports 22h and 24h, are reserved for system configuration purposes. Accesses to these port addresses are responded to by the I/O bus interface circuitry 120 itself, either acting as a standard ISA device listening to the signals on the ISA bus 122, or acting as a local device which listens to the signals on the CPU bus 112 and shortcuts any need to translate the cycle onto the ISA bus 122. In the presently described embodiment, the I/O bus interface circuitry 120 acts as a standard ISA device for these port addresses, listening internally on the I/O bus interface circuitry 120 to the addresses which will be driven onto the ISA bus address lines, responding to an internal copy of the ISA control lines, and reading and writing data via an internal copy of the ISA bus XD data lines.

As is known, the I/O bus interface circuitry 120 extends the capabilities of the two ports 22h and 24h by using an index register configuration scheme. Specifically, the circuitry 120 includes a plurality of 8-bit "index registers" which are not directly addressable externally to the circuitry 120. Instead, in order to access one of the index registers, the CPU 110 (or other CPU bus 112 master or ISA bus 122 master) first writes the number of the desired index register into port 22h, and then reads or writes from port 24h. According to an aspect of the invention, one of these index registers represents the interface between the CPU 110 and clock frequency detection circuitry in the I/O bus interface circuitry 120.

Accordingly, in order to determine the clock frequency of the clock signal on CPU CLK line 114, the CPU 110 need only read an indication of the frequency from the hardware register in which it is stored.

In an aspect of the invention, the value read from the register can also include a validity indication, indicating whether the frequency indication in the value is valid. In the presently described embodiment, one bit of the return value is dedicated to a validity indication. In another embodiment, all bits of the return value may be reserved for the frequency indication, with a predetermined total value (such as 0) predefined to indicate "invalid". Other variations are possible.

Figure 2:
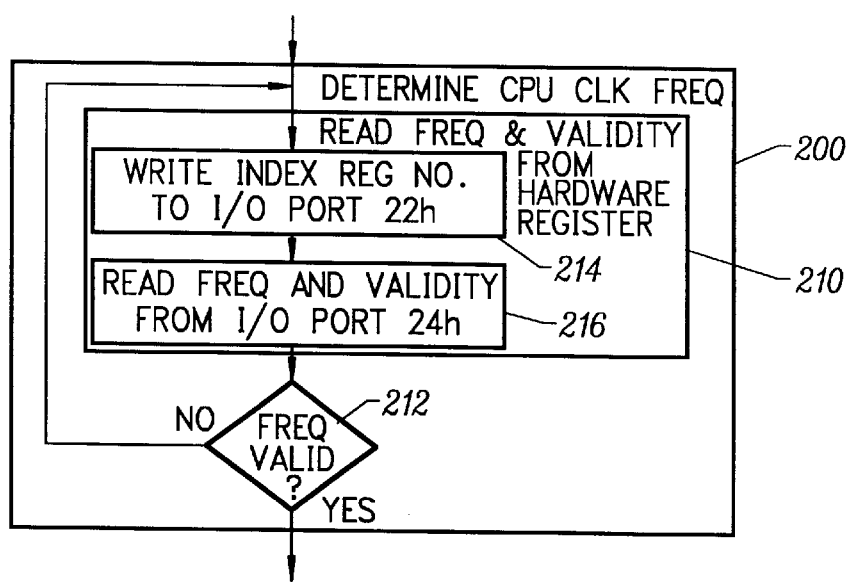
FIGS. 2 and 3 are flow charts illustrating steps performed by the CPU of FIG. 1.

FIG. 2 is a flow chart illustrating the steps performed by the CPU 110 under program control in order to determine the CPU clock frequency. Specifically, in a step 210, the CPU reads the frequency and validity indications from the hardware register assigned for that purpose. In step 212, the CPU checks the validity indication to determine whether the frequency indication is valid. If not, then control returns to step 210 to read the frequency and validity indications again. The loop continues until the validity indication indicates validity, at which point the loop terminates and the CPU has a valid frequency indication. Further, as shown in FIG. 2, the step 210 of reading the frequency and validity indications from the hardware register, includes the steps of writing the index register number for these values to the I/O port 22h (step 214), and then reading the frequency and validity indications from I/O port 24h (step 216).

A number of variations on the embodiment of FIG. 2 are possible. For example, the frequency and/or validity indications may be read directly from an I/O port address assigned for this purpose rather than through the index register mechanism described above. As another example, the frequency and validity indications may be read from an address or addresses in the memory address space. Because of these variations, the term "register" as used herein should be considered to refer to any hardware register which may be read by the CPU 110 under software control, either directly or indirectly.

Figure 3:
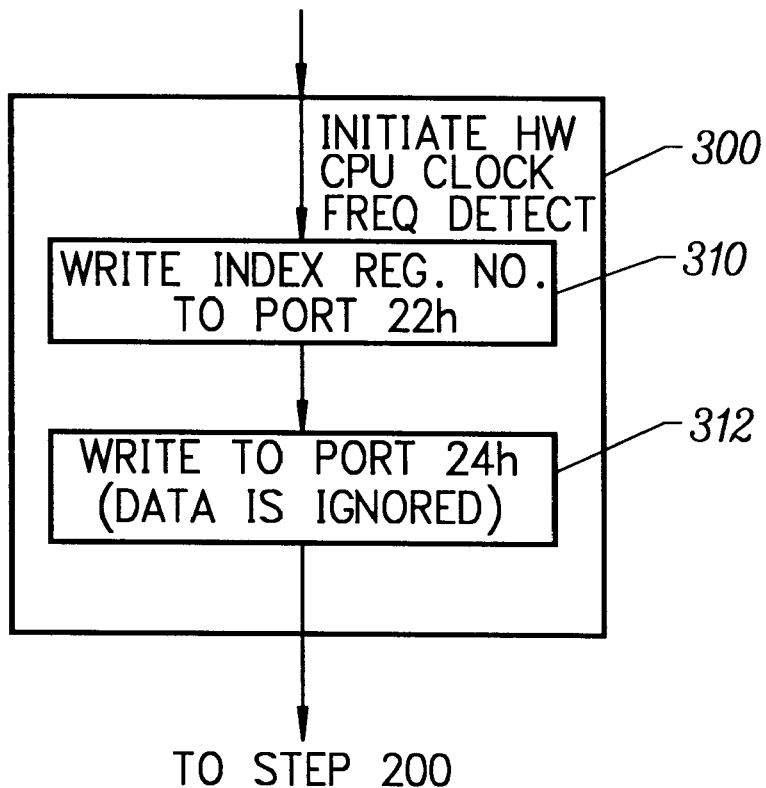

According to an aspect of the invention, the hardware circuitry in the I/O bus interface circuitry 120 which detects the frequency of the CPU clock signal, can update its output in response to negation of the system-wide reset signal and also in response to a trigger from the CPU 110 operating under software control. In the described embodiment, the CPU 110 accomplishes this merely by writing arbitrary data into the same register from which the frequency indication will later be read. This is illustrated in FIG. 3 which depicts the step of initiating the hardware CPU clock frequency detect (step 300) as including a step of writing the index register number assigned for this purpose, to port 22h (step 310), and then writing arbitrary data to port 24h (step 312). The CPU may then continue with the determination of the CPU clock frequency in FIG. 2 (step 200).

Again, a number of variations are possible in different embodiments. For example, in addition to the variations mentioned above, the register which the CPU accesses in order to initiate the hardware CPU clock frequency detection need not be the same register as that from which the resulting frequency indication is read. Also, if different registers are used, then the access which initiates the hardware CPU clock frequency detection need not be a write access, but instead can be a read access. While all these variations are possible, the specific embodiments described in FIGS. 2 and 3 is preferred.

(As used herein, a given signal or event is provided "in response to" a predecessor signal or event if the predecessor signal or event influenced the given signal or event. If there is an intervening processing element or time period, the given event or signal can still be "in response to" the predecessor signal or event. If the intervening processing element combines more than one signal or event, the signal output of the processing element is considered provided "in response to" each of the signal or event inputs. If the given signal or event is the same as the predecessor signal or event, this is merely a degenerate case in which the given signal or event is still considered to be provided "in response to" the predecessor signal or event.)

It can be seen that the program instructions operating in the CPU 110 in order to perform automatic clock frequency detection, occupy very little space in ROM, can execute much more quickly than the conventional software looping technique, and almost never needs to be changed or tuned to accommodate different microprocessors or different caching structures.

Figure 4:
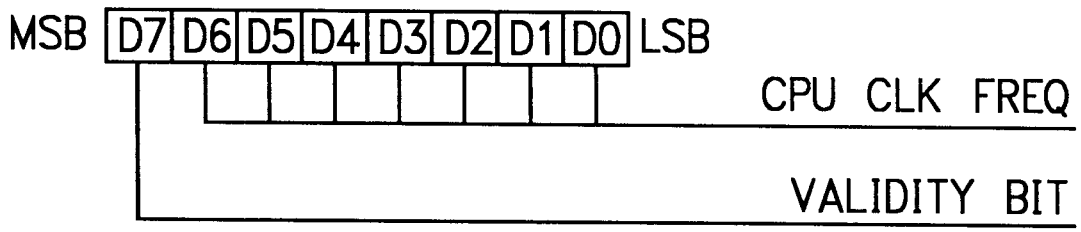
FIG. 4 illustrates an 8-bit register of the I/O bus interface circuitry of FIG. 1.

FIG. 4 defines the bits of the value returned from the register in step 216. It is an 8-bit value, with the low order 7 bits indicating the CPU clock frequency detected by the hardware, and with the high order bit indicating whether the frequency indication in the low order bits is valid.

Figure 5:
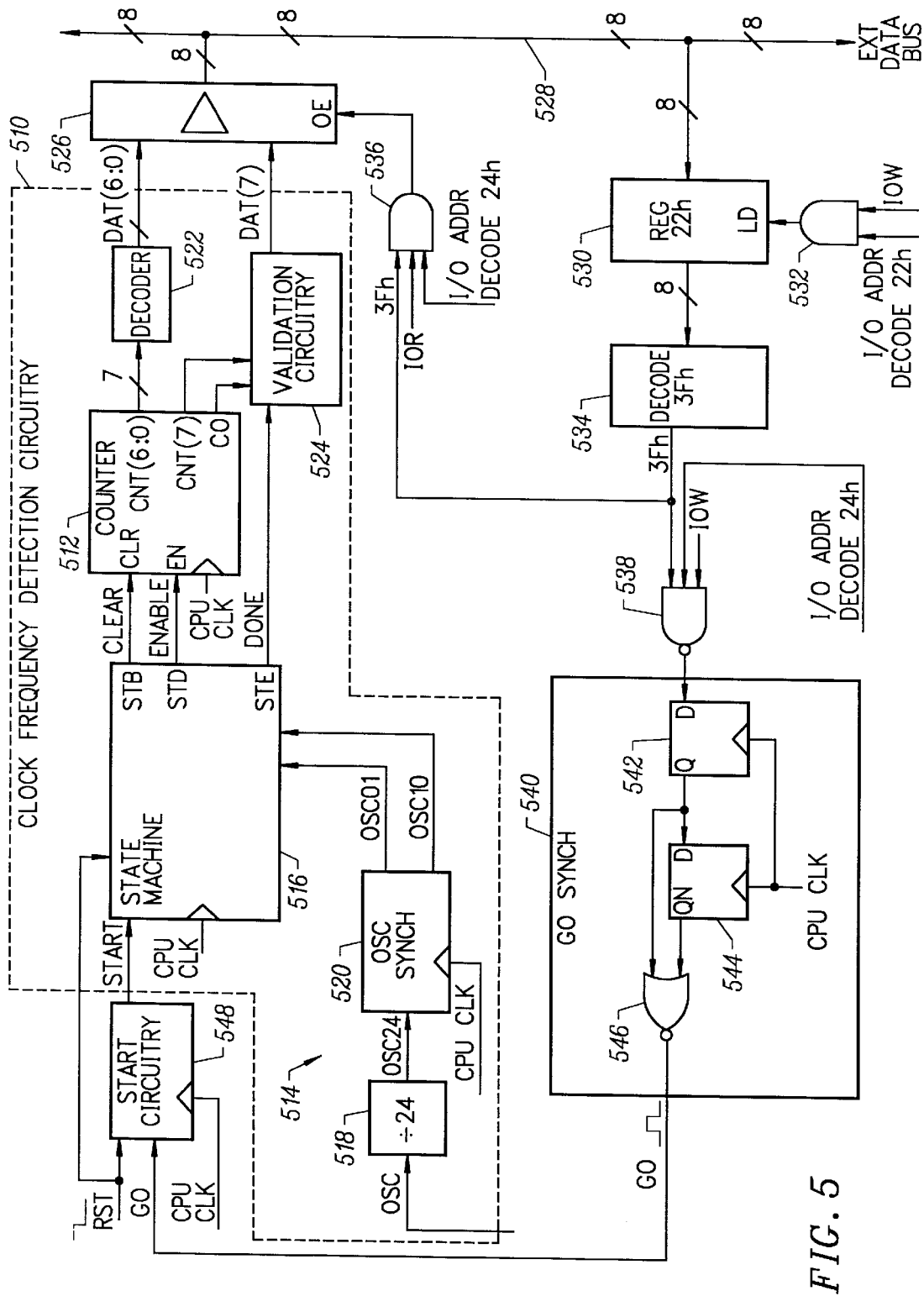
FIG. 5 is a block diagram of circuitry in the I/O bus interface circuitry of FIG. 1.

FIG. 5 is a block diagram of circuitry in the I/O bus interface circuitry 120 which is pertinent to an understanding of an example shown on of the invention. As shown in FIG. 5, the clock frequency detection circuitry 510 itself includes a counter 512 and control circuitry 514. The control circuitry 514 includes a state machine 516, a frequency divider 518, and an OSC synchronization circuit 520. The state machine 516 receives an RST signal which is derived by means not shown from the external RESET# signal. The state machine 516 also receives the CPU clock signal and START signal. The frequency divider 518 takes the ISA bus OSC signal as an input and divides it by a predetermined number, in this case 24, to produce an OSC24 squarewave signal. The OSC24 signal is provided to the OSC synch circuit 520, which synchronizes the rising and falling edges of the OSC24 signal with the CPU CLK signal. Specifically, the OSC synch circuit 520 produces two outputs, OSC01 and OSC10. The OSC01 signal carries a 1-CPU-CLK-wide pulse in response to each rising edge of OSC24, and the OSC10 signal carries a 1-CPU-CLK-wide pulse in response to each falling edge of OSC24. The OSC01 and OSC10 signals are provided to the state machine 516.

The state machine 516 has five states, labeled A through E. It has STB, STD and STE outputs which are asserted only when the state machine 516 is in the respective states, B, D and E. The STB output of state machine 516 is connected to a synchronous clear (CLR) input of counter 512, and the STD output of state machine 516 is connected to a synchronous count enable (EN) input of counter 512. The counter 512 counts in response to each rising edge of the CPU clock signal.

The counter 512 is an 8-bit counter, producing a current count CNT(7:0). The low order 7 bits CNT(6:0) are provided to a decoder 522 in the clock frequency detection circuitry 510, which converts the 7-bit count output of counter 512 to a 7-bit code indicating the frequency detected by counter 512. This code is provided on lines DAT(6:0).

The CNT(7) output of counter 512, together with the carry out (CO) output of counter 512, is provided to validation circuitry 524 in the clock frequency detection circuitry 510. The validation circuitry 524 also receives the STE output of state machine 516. Validation circuitry 524 asserts its output line DAT(7) whenever STE is asserted and neither CNT(7) nor CO are asserted. The state machine 516 asserts STE only after counter 512 is no longer enabled for counting, i.e. after one complete cycle of OSC24. Thus, validation circuitry 524 does not assert DAT(7) while the counter 512 is counting (or clearing). The counter 512 will assert CNT(7) and/or CO only if its count value has exceeded a predetermined maximum count of 127. In this case, the output of decoder 522 will be invalid because decoder 522 has only 7 input bits.

The 8-bit output of clock frequency detection circuitry 510, DAT(7:0) is provided to the input of a 3-state buffer 526, the output of which is provided to an external data bus 528. While only one buffer 526 is shown in FIG. 5, the data path from the output of clock frequency detection circuitry 510 to the external data bus 528 may include additional buffers, latches and registers, not shown in FIG. 5. The external data bus 528 in the present embodiment is the XD bus shown in FIG. 1, but in another embodiment it can be the SD bus and/or the CD bus.

The external data bus 528 is also connected to the data input port of an 8-bit register 530, which holds any data written to I/O port address 22h. Register 530 has a load input connected to the output of an AND gate 532 which receives the ISA-bus IOW signal as one input, and receives as another input, a decode of the I/O address for port 22h. As used herein, a "decode" for a particular address is a signal which is asserted only if the particular address is presently on the address bus. Also, it will be understood that the depiction of AND gates and signals which are asserted high, describe the operation of the circuitry only functionally. It will be understood that actual circuitry may use logical equivalents of that shown in the figure.

The output of register 530 is decoded by a decoder 532 for the index register number which the apparatus uses to interface with the CPU 110. In the present embodiment, the number is 3Fh, although a different embodiment may use a different register number. Decoder 534 is a combinational circuit which asserts its 3Fh output only if the value on its input port is a 3Fh.

The 3Fh output of decoder 534 is connected to one input of a 3-input AND gate 536, a second input of which receives the ISA-bus IOR signal and the third input of which receives an I/O address decode for address 24h. The output of AND gate 536 is connected to the output enable input of buffer 526.

The 3Fh output of decoder 534 is also connected to one input of a 3-input NAND gate 538, a second input of which is connected to receive the ISA-bus IOW signal, and a third input of which is connected to receive the I/O address decode for port address 24h. The output of NAND gate 538 is connected to the input of GO synchronization circuitry 540, which synchronizes the output of NAND gate 538 with the CPU clock signal and produces a 1-CLK-cycle-wide high going pulse on its GO output in response to a high-to-low transition on the output of NAND gate 538. As can be seen in FIG. 5, the GO synchronization circuit 540 includes a D flip-flop 542 which receives the output of NAND gate 538 on its D input. The Q output of flip-flop 542 is connected to the D input of another flip-flop 544. Both flip-flops are clocked with the CPU CLK signal. The Q output of flip-flop 542 and the QN output of flip-flop 544 are both connected to respective inputs of a 2-input NOR gate 546, the output of which provides the GO signal.

The START signal which is provided clock frequency detection circuitry 510, is generated by START circuitry 548, which receives as inputs both the RST signal previously described and the GO signal output of GO synchronization circuitry 540. START circuitry 548 asserts START in response to negation of the RST signal, and also in response to assertion of the GO signal.

In operation, a clock frequency autodetect is triggered on negation of the system reset signal as previously described, and also can be triggered by a CPU write access to index register 3Fh. In order to trigger a clock frequency detection from the CPU under the control of software, the CPU first writes 3Fh into I/O register 22h (FIG. 3, step 310). The I/O bus interface chipset 120 activates the I/O address decode 22h to the AND gate 532, and as part of its translation of the cycle onto the ISA bus 22, asserts the ISA bus IOW signal. Thus, AND gate 532 outputs a logic 1, causing the register 530 to load the 3Fh into the register 530. The CPU 110 then performs a write access to I/O port 24h (FIG. 3, step 312). The I/O bus interface 120 decodes the I/O address 24h for the NAND gate 538 and asserts IOW. Since the output of decoder 534 is asserted, the output of NAND gate 538 goes low for the duration of IOW. The GO synchronization circuitry 540 outputs a highgoing, 1-CLK-cycle pulse on its GO output, which is provided to the START circuitry 548. As previously mentioned, this causes the START circuitry 548 to assert START to the state machine 516 for one CLK cycle.

Figure 6:
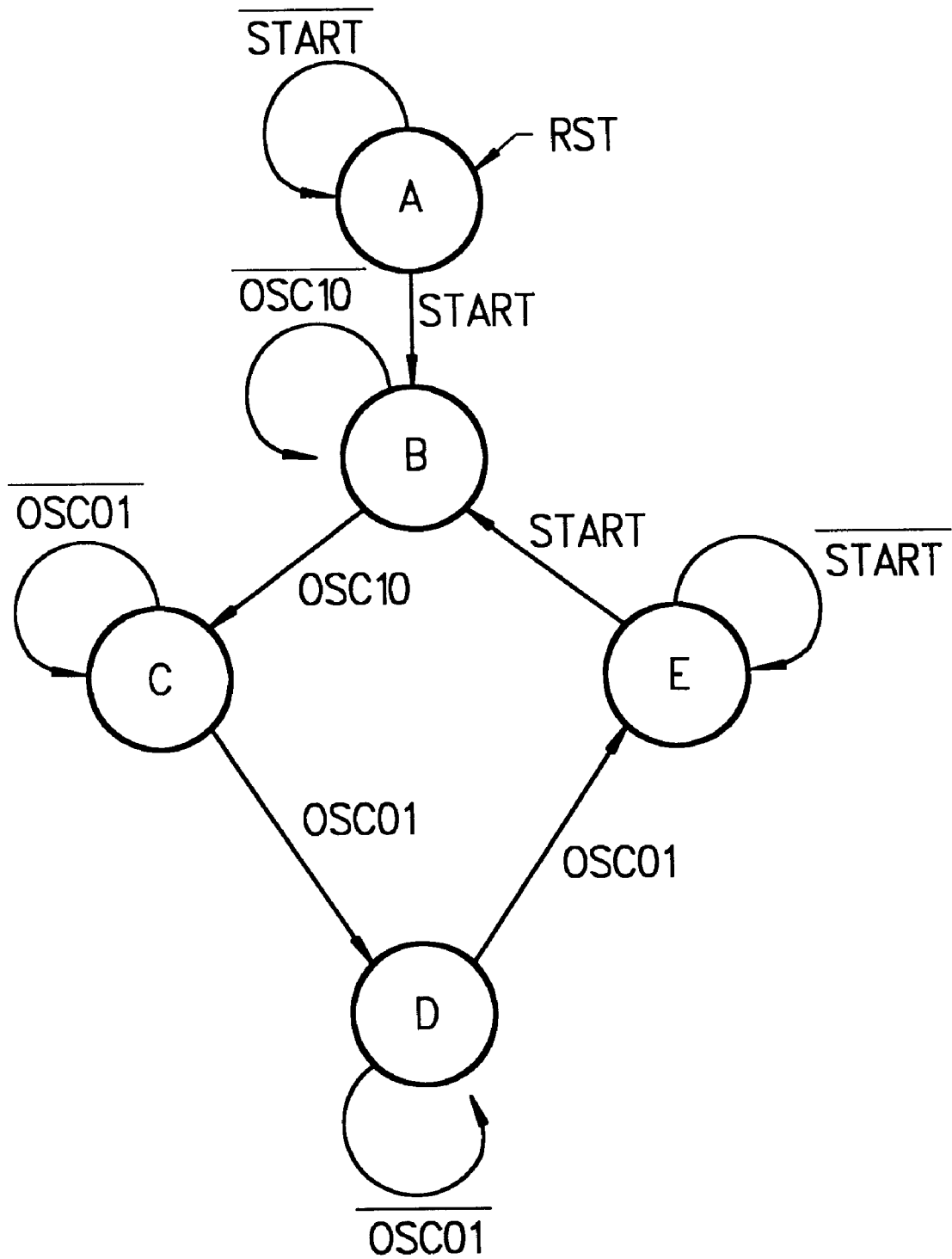
FIG. 6 is a state diagram describing the operation of the state machine in FIG. 5.

FIG. 6 is a state diagram which describes the operation of synchronous state machine 516. The state machine has five states A–E and is implemented using five D flip-flops, one for each state. Other types of flip-flops and different arrangements of flip-flops could also be used as is well known in the art. Referring to FIG. 6, on reset, the state machine goes to state A. The state machine remains in state A as long as START is negated. On the first CLK rising edge at which START is sampled asserted, the state machine switches to state B. In state B, the state machine is clearing the counter 512.

The state machine remains in state B until the first high-to-low transition in OSC24, which is represented by an asserted OSC10, at which time it transfers to state C. In state C, the counter clear signal is negated, and the state machine 516 awaits the next rising edge of OSC24. This is indicated by an asserted OSC01 signal. The state machine then transfers to state D, which again awaits the next 0-to-1 transition of OSC24. The state machine enables the counter to count while it is in state D. Thus, the counter will count CPU CLK rising edges for the entire time period of one full OSC24 cycle.

The state machine then transfers to state E, which negates the counter enable signal and asserts DONE to the validation circuitry 524. The state machine remains in state E for as long as START is negated, and it is during this time that the count is valid (assuming the counter has not exceeded its maximum count). The next time START circuitry 548 asserts START, either because of a reset or because of another trigger from the CPU, the state machine 516 transfers from state E to state B and the process repeats.

Note that while the START signal is assumed to be a pulse having a 1-clock-cycle width, the state machine will operate correctly even if START remains asserted. If it remains asserted through state E, then the clock frequency detection circuitry 510 merely will repeatedly detect the frequency of the CPU CLK signal until START is negated. However, the frequency indication produced by the clock frequency detection circuitry 510 will be valid for only a short time between repetitions.

During and after the detection process, the CPU 110 can read the current reported value by writing 3Fh to I/O address 22h (FIG. 2, step 214), and then reading the value from I/O address 24h (FIG. 2, step 216). The step of writing 3Fh into I/O address 22h was described above. When the CPU reads from I/O address 24h, the I/O address decode for I/O address 24h which is asserted to NAND gate 538 is also asserted to AND gate 536. The 3Fh signal output of the decoder 534 is also asserted, so AND gate 536 enables the output of buffer 526 in response to the ISA-bus IOR signal which the I/O bus interface circuitry 120 asserts when it translates the CPU's read access onto the ISA bus 122. Thus the CPU can read the value at index register 3Fh at any time, check the validity bit, and repeatedly re-read the value until the validity bit is asserted.

Figure 7:
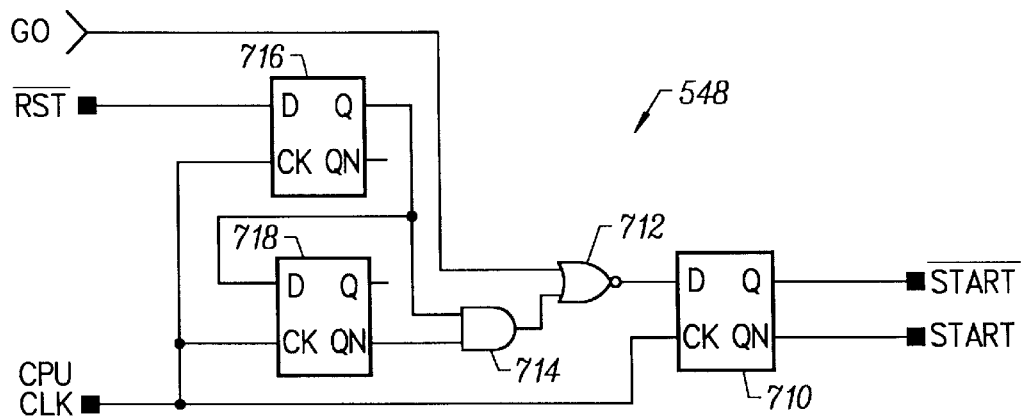
FIG. 7 is a logic diagram of the start circuitry of FIG. 5.

FIG. 7 is a logic diagram of the START circuitry 548 (FIG. 5). It comprises a D flip-flop 710 which is clocked with the CPU CLK signal, and which produces the START signal on its QN output. The D input to flip-flop 710 is connected to the output of a 2-input NOR gate 712, one input of which is connected to receive the GO signal from GO synchronization circuitry 540 (FIG. 5). The other input to NOR gate 712 is connected to the output of a 2-input AND gate 714, one input of which is connected to the Q output of a D flip-flop 716, and the other input of which is connected to the QN output of a D flip-flop 718. The Q output of flip-flop 716 is connected to the D input of flip-flop 718, and both flip-flops 716 and 718 are clocked with the CPU CLK signal.

In operation, it can be seen that flip-flop 710 will produce a START output pulse for the length of time of an incoming GO pulse, but delayed by one CLK cycle. Flip-flop 710 will also produce a 1-CLK-cycle wide START pulse in response to negation of the RST signal (i.e. assertion of RSTB). Flip-flops 716 and 718 synchronize the RST signal with the CPU CLK signal, and AND gate 714 produces the pulse which is delayed by one CLK cycle in flip-flop 710.

Figure 8:
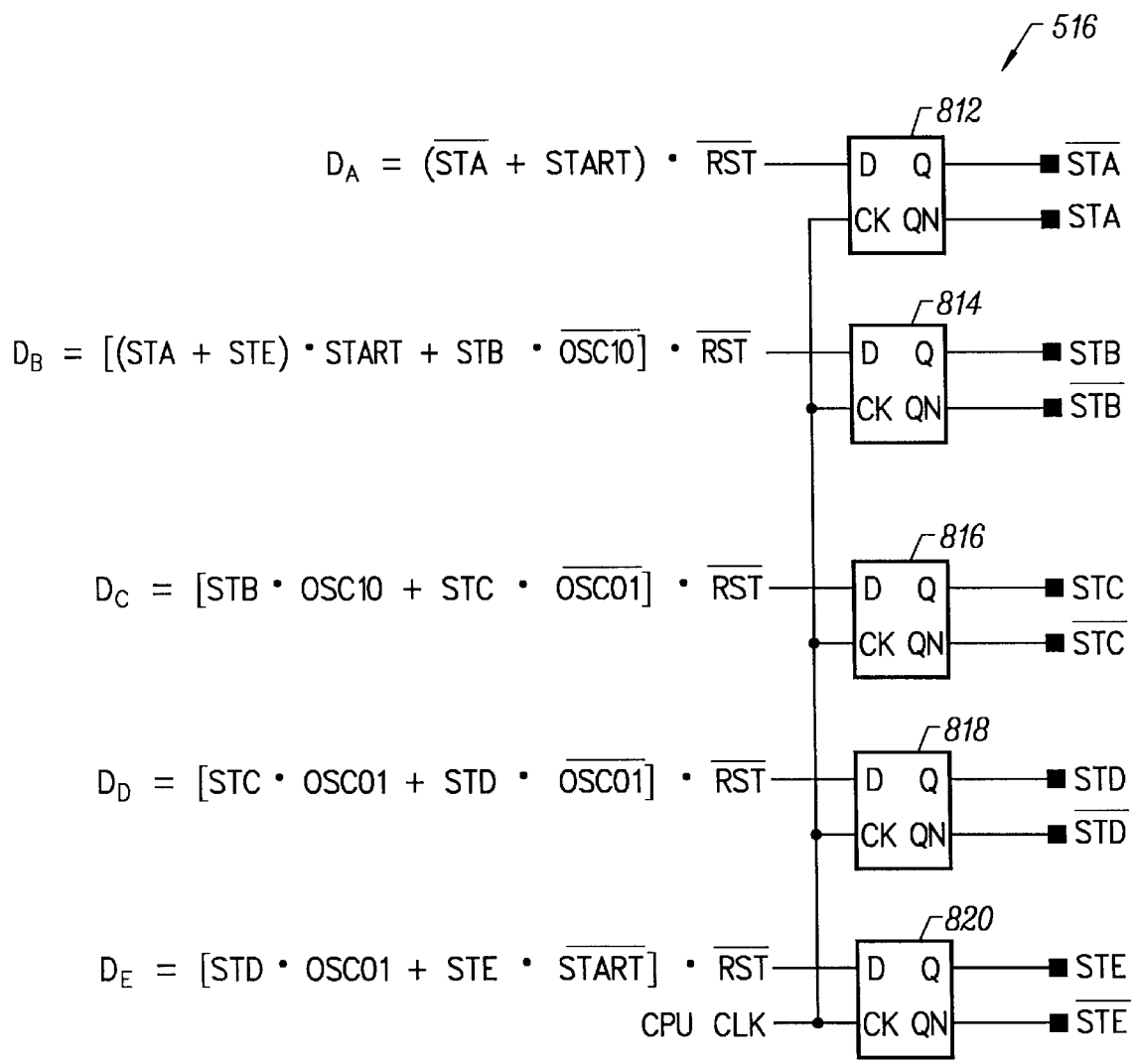
FIG. 8 is a logic diagram of the state machine of FIG. 5.

FIG. 8 is a logic diagram of the state machine 516. It comprises five flip-flops 812, 814, 816, 818 and 820, all of which are clocked by the CPU CLK signal. The flip-flops assert their outputs when the state machine 516 is in states A through E, respectively. In the figures, STA is asserted high (and $\overline{STA}$ is asserted low) if and only if state machine 516 is in state A; STB is asserted high (and $\overline{STB}$ is asserted low) if and only if state machine 516 is in state B; and so on through STE and $\overline{STE}$. Flip-flop 812 produces its active low output signal from its Q output and its active high output signal from its QN output. Flip-flops 814, 816, 818 and 820 each produce their active high output signals from their Q outputs and their active low output signals from their QN outputs. Thus, while STA is the QN output of flip-flop 812, STB-STE are the Q outputs of their respective flip-flops 814–820. The D inputs to flip-flops 812 through 820 carry the following logic functions of the state machine state signals and of the input signals to the state machine 516:

$$D_A = (\overline{STA} + START) \cdot \overline{RST}$$

$$D_B = [(STA + STE) \cdot START + STB \cdot \overline{OSC10}] \cdot \overline{RST}$$

$$D_C = [STB \cdot OSC10 + STC \cdot \overline{OSC01}] \cdot \overline{RST}$$

$$D_D = [STC \cdot OSC01 + STD \cdot \overline{OSC01}] \cdot \overline{RST}$$

$$D_E = [STD \cdot OSC01 + STE \cdot \overline{START}] \cdot \overline{RST}$$

It can be seen that the logic of FIG. 8 accurately implements the state machine state diagram shown in FIG. 6. However, many other equivalent implementations are possible.

The decoder 522 converts the count output on CNT(6:0) to a code on DAT(6:0) which indicates the clock frequency detected by the clock frequency detection circuitry 510. The conversion performed by decoder 522 approximates:

Freq.=Count×OSC/D where Freq represents the frequency of the CPU CLK signal, Count represents the detected counter value, OSC is the 14.31818 MHz input reference frequency, and D represents the divisor value which in the present embodiment is 24. Table I sets forth the logic conversion performed by decoder 522 together with the frequency represented by each output code in the present embodiment.

TABLE I

| CNT(6:0) (decimal) | DAT(6:0) | CLK Freq |
|---|---|---|
| 0 | 0000000 | 0 MHz |
| 1 | 0000001 | 1 MHz |
| 2 | 0000001 | 1 MHz |
| 3 | 0000010 | 2 MHz |
| 4 | 0000010 | 2 MHz |
| 5 | 0000011 | 3 MHz |
| 6 | 0000011 | 3 MHz |
| 7 | 0000100 | 4 MHz |
| 8 | 0000101 | 5 MHz |
| 9 | 0000101 | 5 MHz |
| 10 | 0000110 | 6 MHz |
| 11 | 0000110 | 6 MHz |
| 12 | 0000111 | 7 MHz |
| 13 | 0001000 | 8 MHz |
| 14 | 0001000 | 8 MHz |
| 15 | 0001001 | 9 MHz |
| 16 | 0001001 | 9 MHz |
| 17 | 0001010 | 10 MHz |
| 18 | 0001011 | 11 MHz |
| 19 | 0001011 | 11 MHz |
| 20 | 0001100 | 12 MHz |
| 21 | 0001100 | 12 MHz |
| 22 | 0001101 | 13 MHz |
| 23 | 0001110 | 14 MHz |
| 24 | 0001110 | 14 MHz |
| 25 | 0001111 | 15 MHz |
| 26 | 0001111 | 15 MHz |
| 27 | 0010000 | 16 MHz |
| 28 | 0010001 | 17 MHz |
| 29 | 0010001 | 17 MHz |
| 30 | 0010010 | 18 MHz |
| 31 | 0010010 | 18 MHz |
| 32 | 0010011 | 19 MHz |
| 33 | 0010100 | 20 MHz |
| 34 | 0010100 | 20 MHz |
| 35 | 0010101 | 21 MHz |
| 36 | 0010101 | 21 MHz |
| 37 | 0010110 | 22 MHz |
| 38 | 0010111 | 23 MHz |
| 39 | 0010111 | 23 MHz |
| 40 | 0011000 | 24 MHz |
| 41 | 0011000 | 24 MHz |
| 42 | 0011001 | 25 MHz |
| 43 | 0011010 | 26 MHz |
| 44 | 0011010 | 26 MHz |
| 45 | 0011011 | 27 MHz |
| 46 | 0011011 | 27 MHz |
| 47 | 0011100 | 28 MHz |
| 48 | 0011101 | 29 MHz |
| 49 | 0011101 | 29 MHz |
| 50 | 0011110 | 30 MHz |
| 51 | 0011110 | 30 MHz |
| 52 | 0011111 | 31 MHz |
| 53 | 0100000 | 32 MHz |
| 54 | 0100000 | 32 MHz |
| 55 | 0100001 | 33 MHz |
| 56 | 0100001 | 33 MHz |
| 57 | 0100010 | 34 MHz |
| 58 | 0100011 | 35 MHz |
| 59 | 0100011 | 35 MHz |
| 60 | 0100100 | 36 MHz |
| 61 | 0100100 | 36 MHz |
| 62 | 0100101 | 37 MHz |
| 63 | 0100101 | 37 MHz |
| 64 | 0100110 | 38 MHz |
| 65 | 0100111 | 39 MHz |
| 66 | 0100111 | 39 MHz |
| 67 | 0101000 | 40 MHz |
| 68 | 0101000 | 40 MHz |
| 69 | 0101001 | 41 MHz |
| 70 | 0101010 | 42 MHz |
| 71 | 0101010 | 42 MHz |
| 72 | 0101011 | 43 MHz |
| 73 | 0101011 | 43 MHz |
| 74 | 0101100 | 44 MHz |
| 75 | 0101101 | 45 MHz |
| 76 | 0101101 | 45 MHz |
| 77 | 0101110 | 46 MHz |
| 78 | 0101110 | 46 MHz |
| 79 | 0101111 | 47 MHz |
| 80 | 0110000 | 48 MHz |
| 81 | 0110000 | 48 MHz |
| 82 | 0110001 | 49 MHz |
| 83 | 0110001 | 49 MHz |
| 84 | 0110010 | 50 MHz |
| 85 | 0110011 | 51 MHz |
| 86 | 0110011 | 51 MHz |
| 87 | 0110100 | 52 MHz |
| 88 | 0110100 | 52 MHz |
| 89 | 0110101 | 53 MHz |
| 90 | 0110110 | 54 MHz |
| 91 | 0110110 | 54 MHz |
| 92 | 0110111 | 55 MHz |
| 93 | 0110111 | 55 MHz |
| 94 | 0111000 | 56 MHz |
| 95 | 0111001 | 57 MHz |
| 96 | 0111001 | 57 MHz |
| 97 | 0111010 | 58 MHz |
| 98 | 0111010 | 58 MHz |
| 99 | 0111011 | 59 MHz |
| 100 | 0111100 | 60 MHz |
| 101 | 0111100 | 60 MHz |
| 102 | 0111101 | 61 MHz |
| 103 | 0111101 | 61 MHz |
| 104 | 0111110 | 62 MHz |
| 105 | 0111111 | 63 MHz |
| 106 | 0111111 | 63 MHz |
| 107 | 1000000 | 64 MHz |
| 108 | 1000000 | 64 MHz |
| 109 | 1000001 | 65 MHz |
| 110 | 1000010 | 66 MHz |
| 111 | 1000010 | 66 MHz |
| 112 | 1000011 | 67 MHz |
| 113 | 1000011 | 67 MHz |
| 114 | 1000100 | 68 MHz |
| 115 | 1000101 | 69 MHz |
| 116 | 1000101 | 69 MHz |
| 117 | 1000110 | 70 MHz |
| 118 | 1000110 | 70 MHz |
| 119 | 1000111 | 71 MHz |
| 120 | 1000111 | 71 MHz |
| 121 | 1001000 | 72 MHz |
| 122 | 1001001 | 73 MHz |
| 123 | 1001001 | 73 MHz |
| 124 | 1001010 | 74 MHz |
| 125 | 1001010 | 74 MHz |
| 126 | 1001011 | 75 MHz |
| 127 | 1001011 | 75 MHz |

It will be appreciated that whereas the codes produced by decoder 522 can represent the complete range of frequencies from 0 MHz to 75 MHz in 1 MHz steps, another embodiment could produce a different number of possible codes representing only certain predefined frequencies.

Figure 9:
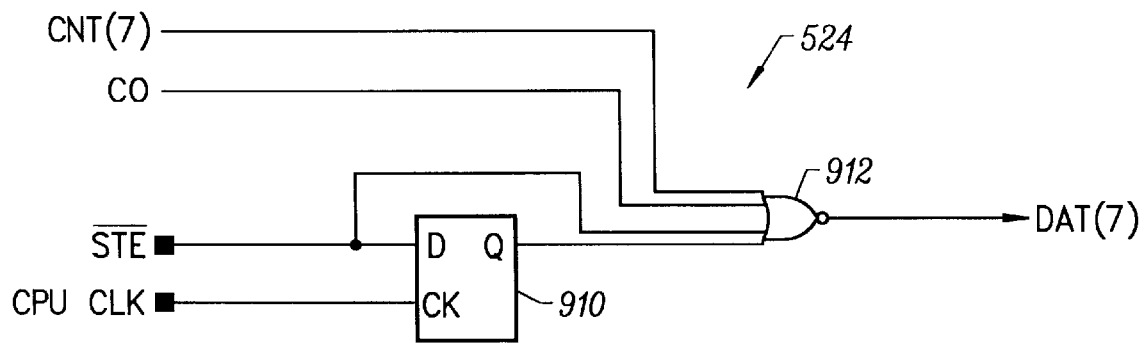
FIG. 9 is a logic diagram of the validation circuitry of FIG. 5.

FIG. 9 is a logic diagram of the validation circuitry 524 (FIG. 5). It comprises a D flip-flop 910, the D input of which is connected to receive $\overline{STE}$ from the state machine 516. The flip-flop 910 is clocked with the CPU CLK signal. The validity output signal, DAT(7), is produced by a 4-input NOR gate 912, the inputs of which are coupled to receive the $\overline{STE}$ signal, the Q output of flip-flop 910, the high order count output bit CNT(7) from the counter 512, and the carry output signal CO from the counter 512. It can be seen that validation circuitry 524 will assert its DAT(7) output one CLK cycle after the state machine 516 enters a state E, and it will maintain DAT(7) asserted until the state machine 516 returns to state A or state B to begin another clock frequency acquisition. The one clock cycle delay before assertion of DAT(7) accommodates any unusually long delay which might be required by decoder circuitry 522 after counting completes, and may be omitted in a different embodiment. Note, however, that validation circuitry 524 will never assert DAT(7) if either CNT(7) or CO, or both, is asserted. If either of these inputs are high, then counter 512 has counted more CLK cycles than can be held in its 7-bit CNT(6:0) output. In this case, the decoder output DAT(6:0) is invalid and validation circuitry 524 does not assert DAT(7).

Figure 10:
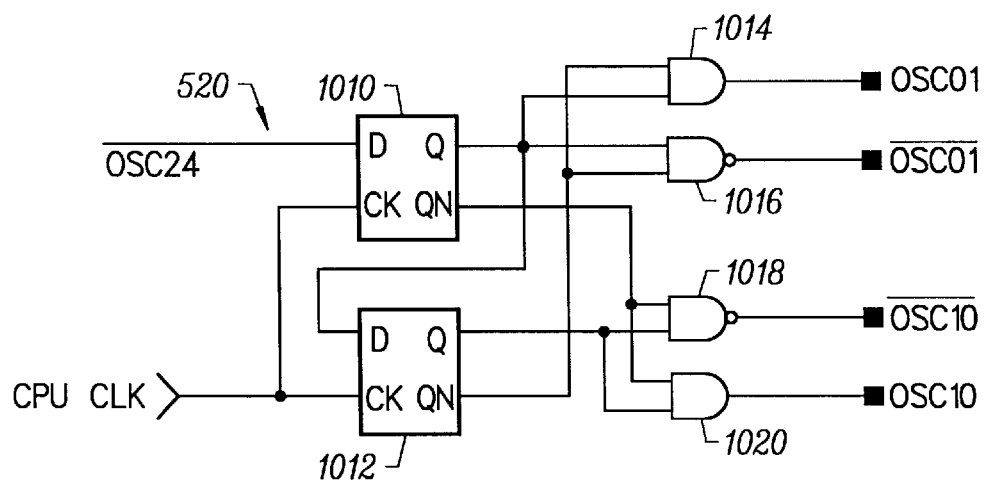
FIG. 10 is a logic diagram of the OSC synchronization circuit of FIG. 5.

FIG. 10 is a logic diagram of the OSC synchronization circuit 520. It comprises a D flip-flop 1010, the D input of which is coupled to receive the OSC24 signal. The Q output of flip-flop 1010 is connected to the D input of another flip-flop 1012. Both flip-flops are clocked by the CPU CLK signal. The OSC01 signal output of OSC synchronization circuitry 520 is generated by an AND gate 1014 connected to receive the Q output of flip-flop 1010 and the QN output of flip-flop 1012. $\overline{OSC01}$ is generated by a NAND gate 1016, the two inputs of which are connected to receive the same two signals. The OSC10 output of OSC synchronization circuitry 520 is generated by an AND gate 1020, one input of which is connected to receive the QN output of flip-flop 1010, and the other input of which is connected to receive the Q output of flip-flop 1012. $\overline{OSC10}$ is generated by a NAND gate 1018 connected to receive the same two signals. It can be seen that OSC synchronization circuitry 520 will assert its OSC01 output after the first CLK rising edge following a 0 to 1 transition in OSC24, and will negate OSC01 after the immediately subsequent CLK rising edge. Similarly, it will assert its OSC10 output after the first rising edge of CLK following a 1 to 0 transition in OSC24, and will negate OSC10 after the immediately subsequent rising edge in the CPU CLK. In each case, therefore, OSC synchronization circuitry 520 produces a 1-CPU-CLK-cycle wide pulse, synchronized with the CPU CLK signal, in response to a respective edge transition in the OSC24 signal.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the clock frequency detection circuitry 510 counts the number of CLK rising edges which take place within a predetermined number of cycles of an input signal having a known frequency, in another embodiment, clock frequency detection circuitry could count the number of cycles of a known-frequency signal which take place within a predefined number of CLK cycles. In this case, the count output of the counter would bear an inverse relationship with the frequency of CLK. The inverse relationship could be decoded in a combinational decoder disposed similarly to decoder 522.

The embodiments described herein were chosen in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. Apparatus for indicating to a CPU the frequency of a clock signal, comprising:
   clock frequency detection circuitry coupled to receive said clock signal and to indicate the frequency of said clock signal, wherein said clock frequency detection circuitry determines the frequency of said clock signal and provides a clock frequency indication validity signal; and
   a three-state buffer coupled to said clock frequency detection circuitry to provide said indication of said frequency to said CPU in response to a read access of a first predetermined address.

2. Apparatus according to claim 1, wherein said clock signal is applied also to said CPU.

3. Apparatus according to claim 1, wherein said CPU is formed onto an integrated circuit and said apparatus is not on said integrated circuit.

4. Apparatus according to claim 1, for use further with an oscillator output signal having a predetermined frequency, wherein said clock frequency detection circuitry comprises a counter coupled to count the number of cycles of said clock signal which occur within a predetermined number of cycles of said oscillator output signal and to produce said count on a counter output.

5. Apparatus according to claim 4, wherein said clock frequency detection circuitry further comprises decoding circuitry coupled between said counter output and said three-state buffer, said decoding circuitry converting said counter output to one of a predefined plurality of available codes, each representing a respective clock frequency.

6. Apparatus according to claim 1, wherein said clock frequency detection circuitry updates said indication of said frequency in response to each assertion of a start signal.

7. Apparatus according to claim 6, for use with a system reset signal, further comprising start circuitry which asserts said start signal in response to negation of said system reset signal.

8. Apparatus according to claim 6, further comprising start circuitry which asserts said start signal in response to an access to a second predetermined address.

9. Apparatus according to claim 8, wherein said access to a second predetermined address is a write access, and wherein said second predetermined address is the same as said first predetermined address.

10. Apparatus according to claim 8, wherein said CPU maintains separate memory and I/O address spaces, wherein said apparatus further comprises an I/O register writable by said CPU in said I/O address space, and wherein said access to a second predetermined address consists of a write access to said second predetermined address while said I/O register contains a predetermined index value.

11. Apparatus according to claim 8, wherein said start circuitry asserts said start signal also in response to negation of said system reset signal.

12. Apparatus according to claim 6, wherein said three-state buffer is coupled further to provide said clock frequency indication validity signal to said CPU in response to said read access of said first predetermined address.

13. Apparatus according to claim 12, for use further with an oscillator output signal having a predetermined frequency, wherein said clock frequency detection circuitry comprises:
   a counter coupled to count the number of cycles of said clock signal which occur within a predetermined number of cycles of said oscillator output signal and to produce said count on a counter output; and
   validation circuitry coupled to negate said clock frequency indication validity signal if said count exceeds a predetermined maximum count.

14. Apparatus according to claim 1, wherein said CPU maintains separate memory and I/O address spaces, wherein said apparatus further comprises an I/O register writable by said CPU in said I/O address space, and wherein said read access of a first predetermined address comprises a read access of said first predetermined address while said I/O register contains a predetermined index value.

15. Clock frequency detection apparatus, for use with a clock signal and an oscillator signal having a predetermined frequency of oscillation, comprising:

a counter coupled to count the number of cycles of said clock signal while said counter is enabled for counting, said counter having a count output;

control circuitry coupled to receive a start signal, and in response to assertion of said start signal, to clear said counter and to subsequently enable said counter for counting for a predetermined number of cycles of said oscillator signal; and start circuitry coupled to said control circuitry, said start circuitry asserting said start signal in response to an access of an address, regardless of data associated with said access of said address.

16. Apparatus according to claim 15, further comprising decoding circuitry coupled to receive said counter output, said decoding circuitry converting said counter output to one of a predefined plurality of available codes, each representing a respective clock frequency.

17. Apparatus according to claim 15, for use with a system reset signal, wherein said start circuitry asserts said start signal in response to a negation of said system reset signal.

18. Apparatus according to claim 15, wherein said access is a write access and said address is an I/O address.

19. Apparatus according to claim 15, wherein said control circuitry comprises:

a frequency divider which divides said oscillator signal by a predetermined value; and circuitry which, in response to said assertion of said start signal, enables said counter for a period of time equal to one full cycle of said divided oscillator signal.

20. Apparatus according to claim 15, further comprising validation circuitry coupled to said control circuitry and having a validity signal output, said validity signal output being negated while said control circuitry is enabling said counter to count.

21. Apparatus according to claim 20, wherein said validation circuitry is further coupled to said counter, said validity signal output being negated also if said count output exceeds a predetermined maximum count.

22. Apparatus according to claim 21, wherein said validation circuitry asserts said validity signal output after said counter is no longer enabled for counting if said count output does not exceed said predetermined maximum count.

23. A method for determining the frequency of a clock signal applied to a CPU, comprising the steps of, in response to a sequence of program instructions:

reading a clock frequency indication validity signal from an address to which a hardware clock frequency detection apparatus responds, wherein said clock frequency indication validity signal is asserted when said hardware clock frequency detection apparatus has made a determination of said frequency; and reading an indication of said frequency from said address to which said hardware clock frequency detection apparatus responds.

24. A method for determining the frequency of a clock signal applied to a CPU, comprising the steps of, in response to a sequence of program instructions:

accessing a first address, hardware clock frequency detection apparatus responding to said access by detecting the frequency of said clock signal, regardless of data associated with said step of accessing said first address; and reading an indication of said frequency from an address to which said hardware clock frequency detection apparatus responds.

* * * * *